(12) United States Patent
Sato et al.

(10) Patent No.: US 8,381,283 B2
(45) Date of Patent: Feb. 19, 2013

(54) INFORMATION PROCESSING APPARATUS AND METHOD OF CONTROLLING PROGRAM EXECUTION OF SAME

(75) Inventors: Junichi Sato, Kanagawa (JP); Hitoshi Suzuki, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1131 days.

(21) Appl. No.: 12/292,209

(22) Filed: Nov. 13, 2008

(65) Prior Publication Data

US 2009/0138963 A1 May 28, 2009

(30) Foreign Application Priority Data

Nov. 28, 2007 (JP) .................................. 2007-306821

(51) Int. Cl.
*G06F 12/14* (2006.01)

(52) U.S. Cl. ..................... 726/17; 726/16; 726/4; 726/2

(58) Field of Classification Search .................. None
See application file for complete search history.

(56) References Cited

U.S. PATENT DOCUMENTS

| 7,404,019 | B2 | 7/2008 | Moyer et al. | |
|---|---|---|---|---|
| 7,434,264 | B2 | 10/2008 | Moyer et al. | |
| 7,962,952 | B2 * | 6/2011 | Saito | 726/4 |
| 2004/0177266 | A1 | 9/2004 | Moyer et al. | |
| 2004/0221173 | A1 | 11/2004 | Moyer et al. | |

FOREIGN PATENT DOCUMENTS

| JP | 61-75446 | 4/1986 |
|---|---|---|
| JP | 2006-523347 | 10/2006 |

* cited by examiner

*Primary Examiner* — Pramila Parthasarathy
(74) *Attorney, Agent, or Firm* — McGinn IP Law Group, PLLC

(57) ABSTRACT

A CPU contained in an information processing apparatus in accordance an exemplary embodiment of the present invention outputs an access request including first access destination address information by a first program, and outputs a check request including second access destination address information when the execution program is switched from the first program to a second program as a result of a program call from the first program to the second program. A protection setting check portion contained in the information processing apparatus checks whether or not the check request including the second access destination address information conforms to protection setting for the first program based on memory protection information that is established in a memory protection information storage portion to detect a violation by a memory access request by the first program.

19 Claims, 12 Drawing Sheets

INFORMATION PROCESSING APPARATUS AND METHOD OF CONTROLLING PROGRAM EXECUTION OF SAME

BACKGROUND

1. Field of the Invention

The present invention relates to a program execution control technique in an information processing apparatus in which program execution is switched among a plurality of programs.

2. Description of Related Art

Techniques for protecting memories from unauthorized memory access, i.e., the so-called memory protection techniques have been well known. When access is carried out by a program executing device such as a CPU (Central Processing Unit) to a memory, such a memory protection technique in the related art verifies the validity of the memory access request output from the CPU or the like by comparing and checking access destination address information contained in the memory access request against memory protection information representing memory areas to which access by the program is permitted. In this way, it is possible to detect unauthorized memory access to memory areas to which access is not permitted, and thus to protect the memory from unauthorized memory access. Furthermore, it is also possible to provide peripheral device protection in which unauthorized access from an instruction execution device such as a CPU to peripheral devices such a clock device, a reset device, and an interrupt controller can be prevented by using a similar technique to that for the memory protection (for example, see Japanese Patent Translation Publication No. 2006-523347).

For example, Japanese Unexamined Patent Application Publication No. 61-75446 (Kimura et al.) discloses an address comparison method for memory protection in an information processing apparatus. To be more precise, the address comparison method disclosed in Kimura et al. determines whether or not an access destination address accessed by a program is within a certain range in a partial memory space to which access is permitted (access permission range) by comparing the access destination address with the lower limit address and the upper limit address of the access permission range. Then, access to the partial memory space is permitted only when the access destination address is within the access permission range.

However, the above-described protection technique in which the permission for each access is controlled at the time when access to a memory or a peripheral device occurs has the problem described below. This problem occurs when an application program 1 calls another application program (a subprogram, a function, or the like), e.g., when an application program 1 calls a driver program used to operate a communication interface and requests it to carry out data transfer.

That is, in such a case where a malfunction occurs in the application program 1 or a case where the application program 1 is a harmful malevolent program, there is a possibility that an unauthorized process such as unauthorized external transfer of security information and unauthorized overwriting of original data in memory areas that are used for other programs or an operating system (OS) with externally received data is carried out. It may be expected that when such an unauthorized application program 1 attempts to directly access to a memory area where security information is recorded or to a memory area which is used by other programs or an OS, the above-described memory protection technique will prevent such unauthorized memory access. However, when such an unauthorized application program 1 attempts indirect memory access through another application program 2 such as a device driver for communication, it is very difficult to perform substantially sufficient memory protection by using the above-described memory protection technique. For example, if the application program 2 that is called from the unauthorized application program 1 is permitted to access to a wider range of the memory area in comparison to the application program 1, the memory protection could become insufficient. That is, in a case where designation to a memory area, the access of which is not permitted to the application program 1 but is permitted to the application program 2, is included in the arguments that are passed to the application program 2 as the application program 2 is called, and then the application program 2 attempts to access to that memory area, the above-described memory protection technique could not provide sufficient memory protection. Since the application program 2 carries out memory access to the memory area that is permitted to the application program 2, it is very difficult to detect that access as unauthorized access at the time when the actual memory access is carried out by the application program 2.

Accordingly, to cope with such a problem in the memory protection relating to the above-described program call, a check is carried out by the OS or the application program 2 to determine whether or not an address designated in the arguments at the time of the program call for the application program 2 is legitimate for the application program 1, i.e., whether or not the address belongs to an memory area to which the application program 1 is permitted to access before the actual execution of the application program 2 is started.

This check is carried out, for example, by the intervention of the OS in the program call for the application program 2. Specifically, when a program call occurs, the OS checks the access authority of the caller application program 1 in regard to access destinations included in the arguments passed from the application program 1. Then, only when the validity of the access authority is confirmed, the execution of the application program 2 is started.

In order to carry out a check, at the occurrence of a program call, on the access authority of the caller application program 1 in regard to access destinations included in the arguments passed from the application program 1 by using mainly software that is executed by an instruction execution device, such as the OS or the called application program 2, the following procedure needs to be carried out. That is, the OS or the application program 2 is required not only to read memory protection information into a storage portion such as a register in the CPU, but also to carry out calculation to compare the set values in the read memory protection information with the contents of the arguments. Furthermore, the memory area to which access by a program is permitted is not always limited to a single continuous memory area. Instead, such access is often permitted to several divided memory areas. In such a case where the access is permitted to several memory areas, the memory protection information contains several set values for their respective memory areas, and these several set values needs to be checked one by one. Therefore, the time needed for the checking process also increases in proportion to the increase in the number of set values for the memory protection.

SUMMARY

There is a problem that the time needed for the checking process increases in a method of checking the access authority of a caller program in which software that is executed by an instruction execution device such as a CPU is mainly used.

In accordance with a first aspect of the present invention, an information processing apparatus includes an instruction execution portion, a protection information storage portion, a protection violation detection portion, and a protection setting check portion. The instruction execution portion is capable of switching between and executing a first program and a second program, outputs an access request including first access destination address information by the first program, and outputs a check request including second access destination address information when the execution program is switched from the first program to the second program as a result of a program call from the first program to the second program. The protection information storage portion stores protection information that designates the permission/denial for access from a program to be executed in the instruction execution portion. The protection violation detection portion detects whether the access request including the first access destination address information is in violation or not based on the protection information that is established in the protection information storage portion so as to correspond to the first program. Finally, the protection setting check portion checks whether or not the check request including the second access destination address information conforms to protection setting for the first program based on the protection information that is established in the protection information storage portion to detect a violation by the access request by the first program.

As stated above, in an information processing apparatus in accordance with a first aspect of the present invention, the instruction execution portion outputs a check request including second access destination address information when the execution program is switched from a first program to a second program as a result of a program call from the first program to the second program. Furthermore, it is also configured such that the protection setting check portion checks whether or not the check request conforms to protection setting for the first program based on protection information that is established in the protection information storage portion to detect a violation by the access request by the first program. In this way, since the protection information does not need to be read into the instruction execution portion to check the access authority of the caller program, the validity of the program call for the second program can be verified with efficiency.

Furthermore, the protection setting check portion can carry out a check on the second access destination address information to detect a violation by the access request by the caller program, i.e., the first program by using the protection information, which is already established in the protection information storage portion, without requiring any additional process. That is, since no read operation or write operation for additional protection information is required to check the second access destination address information, the efficiency of the check process can be further improved.

The present invention can verify the validity of the execution of a called program in terms of memory protection or peripheral device protection when the execution program is switched as a result of a program call.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Exemplary embodiments to which the present invention is applied are explained hereinafter with reference to the drawings. The same signs are assigned to the same components throughout the drawings, and duplicated explanation is omitted as appropriate for the clarification of the explanation.

Note that the term "CPU (Central Processing Unit)" means a processing unit having an instruction fetch function, an instruction decode function, and an instruction execution function in the following exemplary embodiments of the present invention.

[First Exemplary Embodiment]

Figure 1:
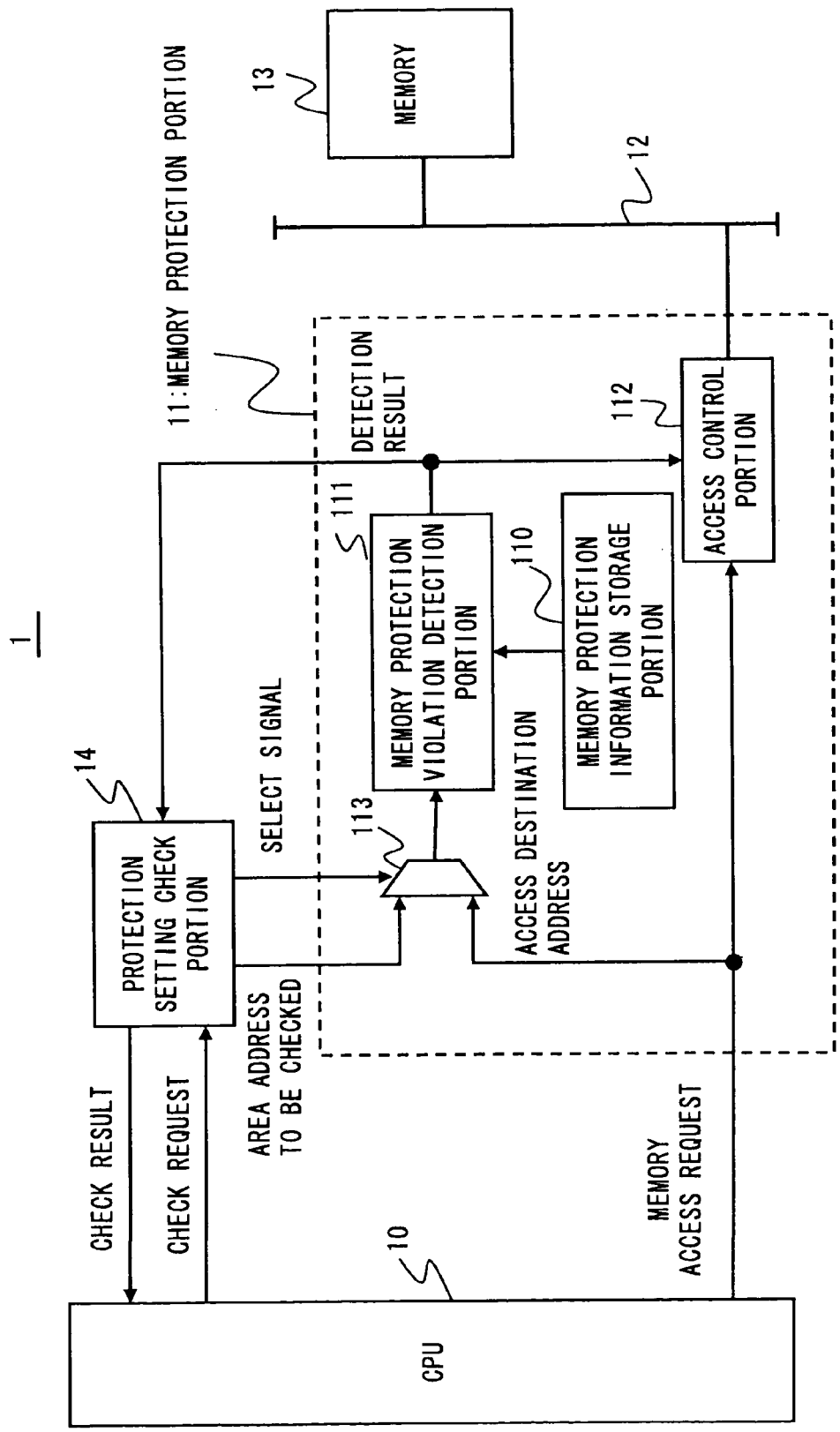
FIG. 1 is a block diagram showing the structure of an information processing apparatus in accordance with a first exemplary embodiment of the present invention.

An information processing apparatus 1 in accordance with a first exemplary embodiment of the present invention has a memory protection function. FIG. 1 is a block diagram showing the structure of the principal parts of the information processing apparatus 1. In FIG. 1, a CPU 10 reads out an instruction from a memory 13, decodes the read instruction, and carries out a process in accordance with the decoded instruction, e.g., a computational process such as an arithmetic operation and a logical operation, and read access and write access to the memory 13. Furthermore, when the execution program is switched in response to a program call such as a function call or a subprogram call, the CPU 10 in accordance with the first exemplary embodiment verifies the validity of the execution of the called program in terms of memory protection or peripheral device protection. Therefore, the CPU 10 outputs memory area addresses to which the called program is expected to access (which is called "area to be checked" hereinafter) to a protection setting check portion 14 (which is explained later) before the actual execution of the called program.

In the first exemplary embodiment of the present invention, the area to be checked includes memory areas to which the caller program accesses indirectly through the called program. The memory area to which the caller program accesses indirectly through another program is explicitly designated, for example, as an argument at the program call as explained above, and passed to the OS that controls the switching of the execution program. Alternatively, the memory area to which the caller program accesses indirectly may be implicitly designated. For example, the OS may determine the area to be checked in response to a program call by referring to a storage area (e.g., a register) that is specified in advance depending on a caller program or a called program.

A memory protection portion 11 receives an access request to the memory 13 generated by the CPU 10. The access request supplied from the CPU 10 contains the type of read/write operation, an access destination address, and write data (if the access is write access). The access destination address can be designated in various formats. For example, an access destination address may be designated by an address alone to designate the access destination on a word basis. Alternatively, it may be designated by the combination of a base address and the size of data for which transfer is requested, or the combination of the lower limit address and the upper limit address of an area where data to be transferred is located to designate the access destination in a multiple-word unit.

Memory protection information stored in a memory protection information storage portion 110 is established depending on a program executed in the CPU 10, and updated in response to the switching of the program executed in the CPU 10 such that it has setting suited for the program to be executed after the switching. The rewriting to the memory protection information storage portion 110 is carried out, for example, by a system program that is invoked upon switching of the program executed in the CPU 10, so that it is updated to setting suited for the program to be executed after the switching. Setting for memory areas to which access is permitted or prohibited in the memory protection information may be also made in various formats, as in the case of the access destination addresses. For example, the setting for a memory area in the memory protection information may be designated by the combination of the lower limit address and the upper limit address of the memory area, or the combination of the top address (lower limit address or upper limit address) and the area size. Alternatively, it may be designated by using a method in which the top address of the memory area and the number of lower digits that are masked are designated so that memory area that has an amount equivalent to a power of two and starts from the top address is designated. That is, there is no specific restriction on the way of designating a memory area that is put under the memory protection.

A memory protection violation detection portion 111 contained in the memory protection portion 11 determines whether an access request is permitted or not by comparing an access destination address to which the CPU 10 requests access with the memory protection information established in the memory protection information storage portion 110.

An access control portion 112 permits memory access when an access destination address contained in a memory access request indicates the memory area to which the access is permitted. On the other hand, the access control portion 112 prohibits the memory access when the access destination address indicates the memory area to which the access is prohibited. Note that when the memory protection violation detection portion 111 or the access control portion 112 detects access to the memory area to which the access is prohibited, it preferably outputs a signal indicating the detection of the unauthorized access to the CPU 10.

A selector 113 switches the address information that is input to the memory protection violation detection portion 111 and compared with the memory protection information between the access destination address contained in the memory access request supplied from the CPU 10 and an area addresses to be checked that is contained in the check request (which is explained later). The operation of the selector 113 in the first exemplary embodiment of the present invention is controlled by the protection setting check portion 14 (which is explained later).

The memory 13 is connected to the memory protection portion 11 through the memory bus 12. The memory 13 is used, for example, as a storage area for system programs and application programs that are read and executed by the CPU 10, and as a storage area for data that is used by those system programs and application programs. That is, the memory 13 may be a RAM, a ROM, a flash memory, or the like, or a combination thereof. Furthermore, the memory bus 12 is a collective term for an address bus and a data bus.

The protection setting check portion 14 receives a check request containing the area address to be checked from the CPU 10, checks the validity of the area address to be checked by determining whether or not it conforms to the memory protection setting for the caller program, and supplies the check result to the CPU 10. More specifically, the protection setting check portion 14 uses the memory protection information, which is already established in the memory protection information storage portion 110 for the detection of a violation by an access request by the caller program, without carrying out any additional process, and compares the memory protection information corresponding to the caller program with the area address to be checked in order to check whether or not the area to be checked is within the memory area to which the caller program is permitted to access. Furthermore, the comparison check between the area address to be checked and the memory protection information and the comparison check between the access destination address contained in the memory protection violation detection portion 111 and the memory protection information are both carried out by the same hardware in the structure of the first exemplary embodiment of the present invention shown in FIG. 1.

Needless to say, the structure described above with reference to FIG. 1 is merely an example. For example, although the memory protection portion 11 directly accesses to the memory bus 12 in the above explanation, the access to the memory bus 12 and the memory 13 may be carried out through another device such as a memory controller (not shown). Furthermore, the same physical transmission path may be used at least partially in common between the check request path and the access request path. Furthermore, although the selector 113 is contained in the memory protection portion 11 in FIG. 1, an actual hardware configuration of the information processing apparatus 1 is not limited to the illustrated configuration. That is, the only necessary requirement for the selector 113 in FIG. 1 is that it should be located at a stage preceding the memory protection violation detection portion 111 so that an access destination address contained in the memory access request or an area address to be checked contained in the check request can be selectively supplied to the memory protection violation detection portion 111.

Figure 2:
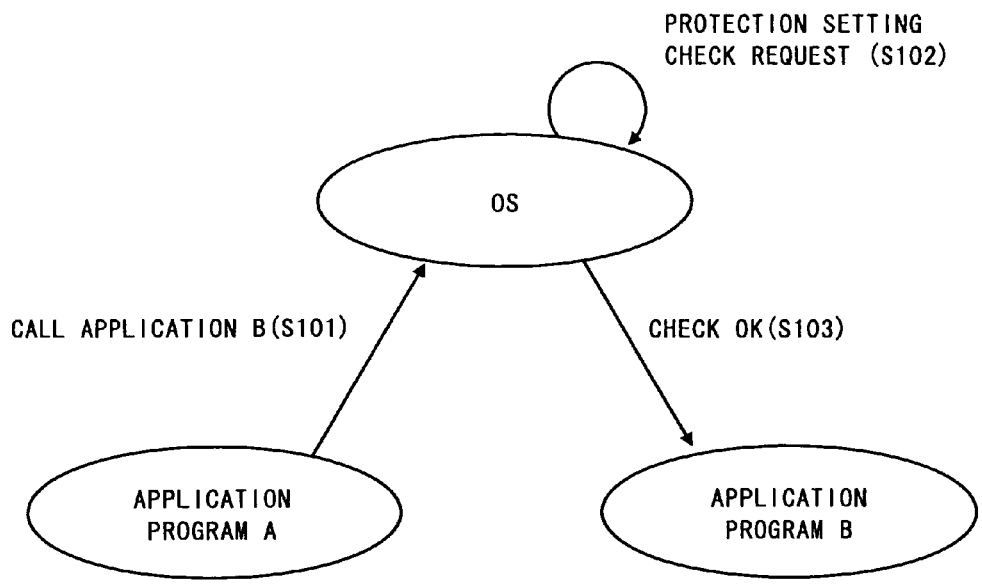
FIG. 2 is a conceptual diagram for illustrating the operation for a program call in an information processing apparatus in accordance with the first exemplary embodiment of the present invention.

Detailed configuration examples and operations of each component included in the information processing apparatus 1 shown in FIG. 1 are explained hereinafter. FIG. 2 is a conceptual diagram for illustrating the switching of the execution program in the CPU 10. When an application program B is called while another application program A is executed in the CPU 10 (S101), the system program, i.e., the OS issues a check request to the protection setting check portion 14 before the called application program B is actually executed (S102). The OS starts the execution of the called application program B when it is verified that the area address to be checked conforms to the memory protection for the caller program by the check result, which is supplied from the protection setting check portion 14 to the CPU 10.

Figure 3A:
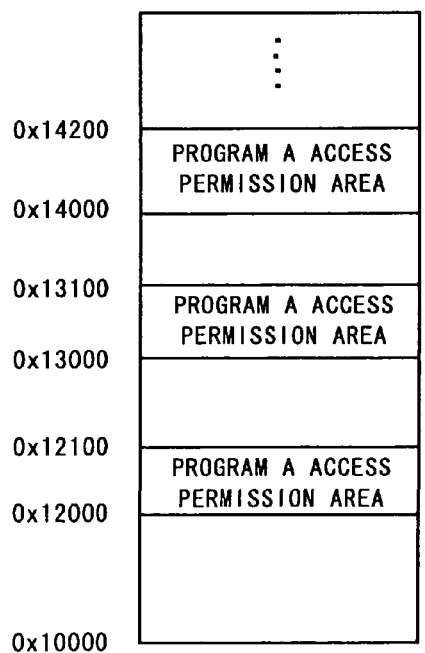
FIGS. 3A and 3B are memory maps for illustrating memory protection setting in an information processing apparatus in accordance with the first exemplary embodiment of the present invention.
Figure 3B:
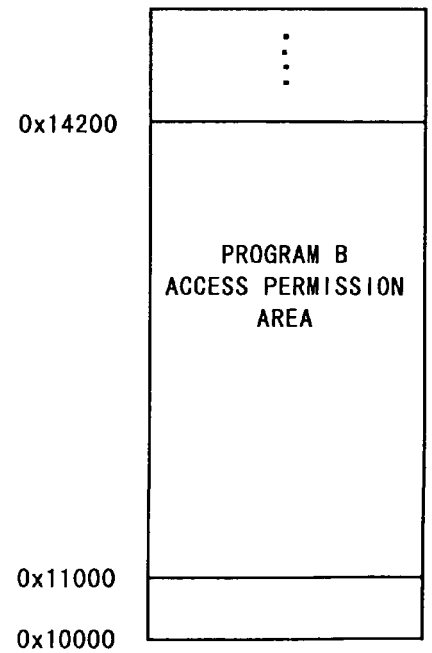

FIGS. 3A and 3B show examples of the memory map of the memory 13. In particular, FIG. 3A is a memory map showing an example of an access permission area for the application program A. In the example of FIG. 3A, three areas, i.e., addresses 12000-120FF, addresses 13000-130FF, and addresses 14000-141FF are permitted for the access by the application program A. Meanwhile, FIG. 3B is a memory map showing an example of an access permission area for the application program B. In the example of FIG. 3A, the access by the application program B is permitted to one area spreading from address 11000 to address 141FF, which includes all of the access permission areas for the application program A.

Figure 4A:
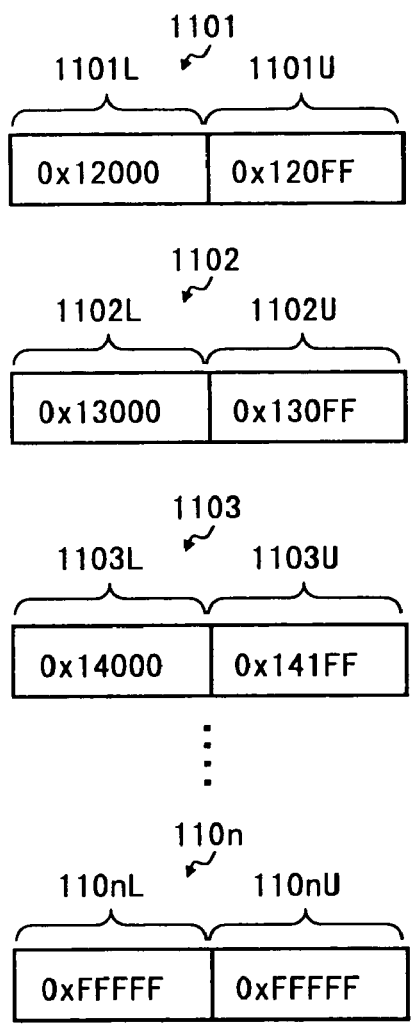
FIGS. 4A and 4B show configuration examples of a memory protection information portion included in an information processing apparatus in accordance with the first exemplary embodiment of the present invention.
Figure 4B:
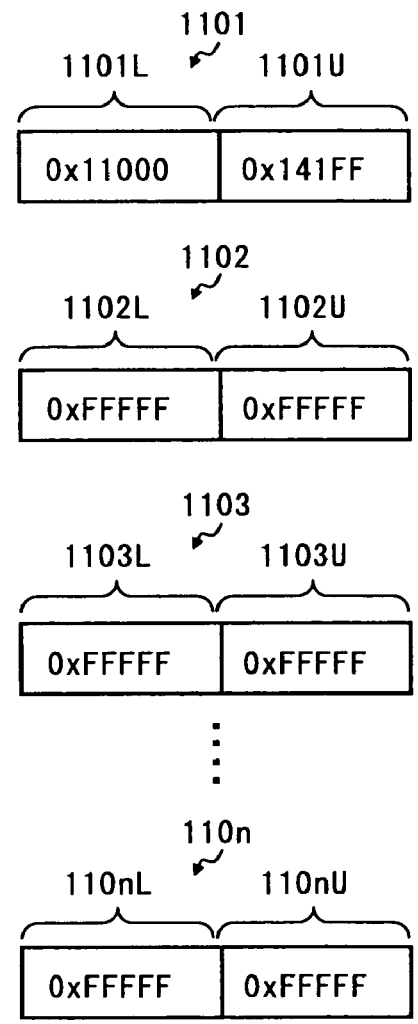

FIGS. 4A and 4B show configuration examples of the memory protection information portion 110. In particular, FIG. 4A shows the setting corresponding to the access permission area for the application program A shown in FIG. 3A. Furthermore, FIG. 4B shows the setting corresponding to the access permission area for the application program B shown in FIG. 3B.

In the examples of FIGS. 4A and 4B, the memory protection information storage portion 110 is composed of n protection setting registers 1101-110n, so that each of them can designate one access permission area. Furthermore, an access permission area in each of the protection setting registers 1101-110n is designated with the lower limit address and the upper limit address. For example, the protection setting register 1101 shown in FIG. 4A is a register retaining the setting corresponding to the access permission area of the addresses 12000-120FF in FIG. 3A, and an address 12000 is designated in the lower limit address designation portion 1101L and an address 120FF is designated in the upper limit address designation portion 1101U. Similarly, the protection setting register 1102 shown in FIG. 4A retains the setting corresponding to the access permission area of the addresses 13000-130FF in FIG. 3A. Furthermore, the protection setting register 1103 shown in FIG. 4A retains the setting corresponding to the access permission area of the addresses 14000-141FF in FIG. 3A. Meanwhile, the protection setting register 1101 shown in FIG. 4B retains the setting corresponding to the access permission area of the addresses 11000-141FF in FIG. 3B.

Incidentally, the remaining registers that are not used for the setting of the access permission areas are preferably specified as having invalid setting by writing invalid values (e.g., FFFFF) as the upper and lower limit addresses, as shown at the protection setting register 110n in FIG. 4A and the protection setting register 1102 in FIG. 4B. Furthermore, an additional storage area to retain flags indicating the validity/invalidity of each of the protection registers 1101-110n may be provided.

Figure 5:
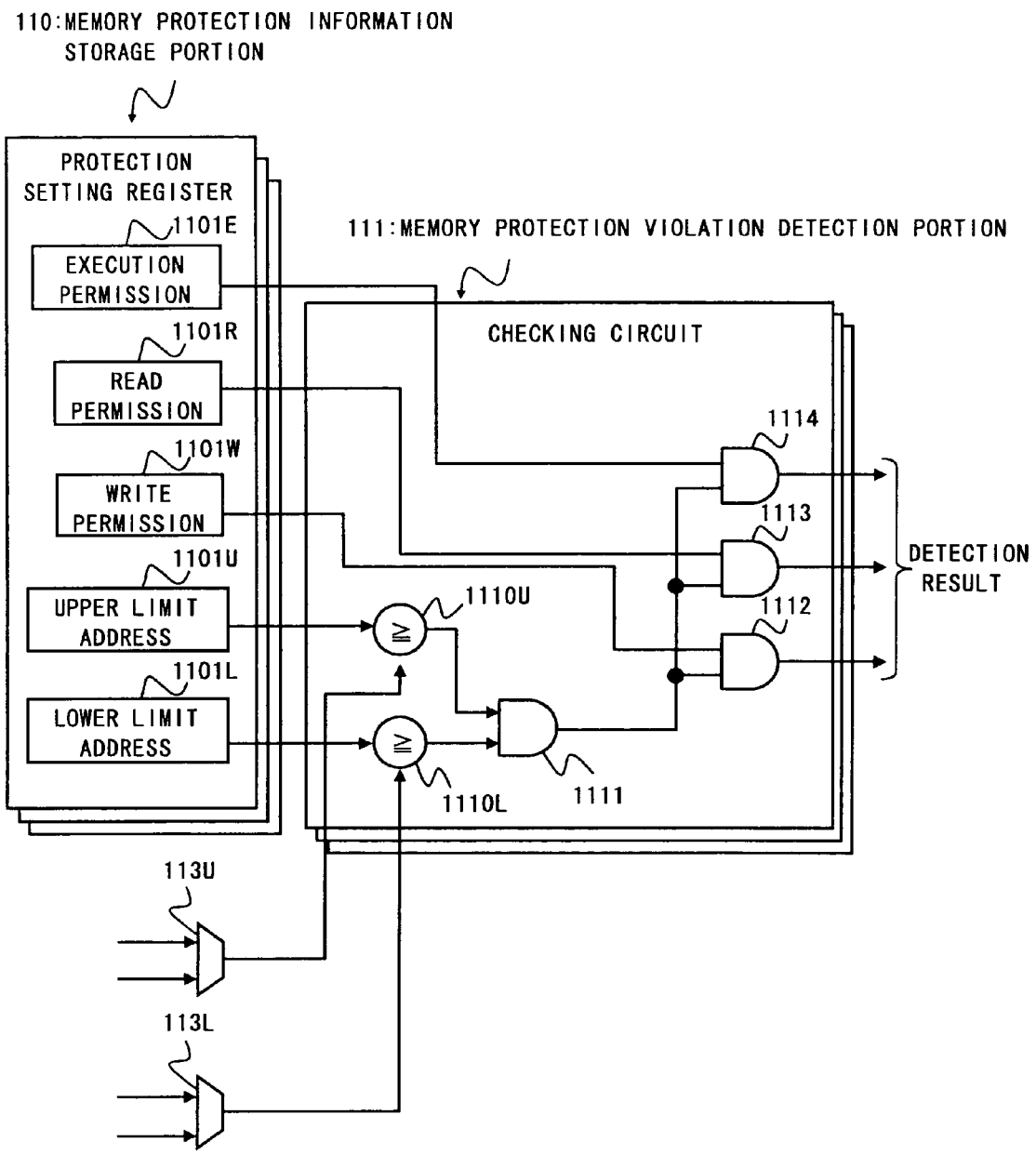
FIG. 5 shows a configuration example of a memory protection violation detection portion included in an information processing apparatus in accordance with the first exemplary embodiment of the present invention.

Next, a configuration example of the memory protection violation detection portion 111 is explained hereinafter with reference to FIG. 5. The memory protection information storage portion 110 shown in FIG. 5 is configured in a similar manner to the examples in FIGS. 4A and 4B, that is, composed of a group of plural protection setting registers. However, each protection register shown in FIG. 5 specifies, in addition to the upper and lower limit addresses of an access permission area, the type of permission, i.e., write access, read access, and instruction fetch access for that access permission area. A write permission designation portion 1101W indicates write access permission when it has a value "1", and indicates write access denial when it has a value "0". Similarly, a read permission designation portion 1101R indicates read access permission when it has a value "1", and indicates read access denial when it has a value "0". Furthermore, an execution permission designation portion 1101E indicates instruction fetch access permission when it has a value "1", and indicates instruction fetch access denial when it has a value "0".

In FIG. 5, selectors 113U and 113L are selectors that are contained in the selector 113 shown in FIG. 1. The selector 113U selectively supplies the upper limit address of the access destination area or the area to be checked from the CPU 10 to the memory protection violation detection portion 111. On the other hand, the selector 113L selectively supplies the lower limit address of the access destination area or the area to be checked from the CPU 10 to the memory protection violation detection portion 111.

Furthermore, the memory protection violation detection portion 111 shown in FIG. 5 is composed of a group of the same number of checking circuits as the number of protection setting registers. Each of the checking circuits shown in FIG. 5 includes comparison circuits 1110U and 1110L and AND circuits 1111-1114. Each of the AND circuits 1111-1114 is a circuit to output the logical product of two input values.

The comparison circuit 1110U compares a value retained in the upper limit address designation portion 1101U of the protection setting register with an address supplied from the selector 113U. The comparison circuit 1110U outputs a value "1" as a true value when the address supplied from the selector 113U is equal to or less than the upper limit address retained in the upper limit address designation portion 1110U, and outputs a value "0" as a false value when it is larger than the upper limit address retained in the upper limit address designation portion 1101U.

The comparison circuit 1110L compares a value retained in the lower limit address designation portion 1101L of the protection setting register with an address supplied from the selector 113L. The comparison circuit 1110L outputs a value "1" as a true value when the address supplied from the selector 113L is equal to or larger than the lower limit address retained in the lower limit address designation portion 1101L, and outputs a value "0" as a false value when it is smaller than the lower limit address retained in the lower limit address designation portion 1101L.

The output of the AND circuit 1111 becomes the true value "1" when both outputs from the comparison circuits 1110U and 1110L have true values, i.e., when the memory area that is specified by the two address information supplied from the selectors 113U and 113L is within the access permission area. Furthermore, the output of the AND circuit 1112 becomes the true value "1" when the memory area that is specified by the two address information supplied from the selectors 113U and 113L is within the access permission area and the write access is permitted. Similarly, the output of the AND circuit 1113 becomes the true value "1" when the memory area that is specified by the two address information supplied from the selectors 113U and 113L is within the access permission area and the read access is permitted. Furthermore, the output of the AND circuit 1114 becomes the true value "1" when the memory area that is specified by the two address information supplied from the selectors 113U and 113L is within the access permission area and the instruction fetch access is permitted.

Note that although the memory protection violation detection portion 111 separately outputs each detection result for write access, read access, and instructions fetch access in the example shown in FIG. 5, it should be understood that such a structure is merely an example. For example, the memory protection violation detection portion 111 may carry out more detailed violation detection in terms of access type, or may carry out the minimum detection, i.e., detection merely whether it is within the access permission area or not.

Next, configuration examples and operations of the protection setting check portion 14 as well as specific examples of data exchange relating to check requests and check results between the CPU 10 and the protection setting check portion 14 are explained hereinafter with reference to FIGS. 6-8.

Figure 6:
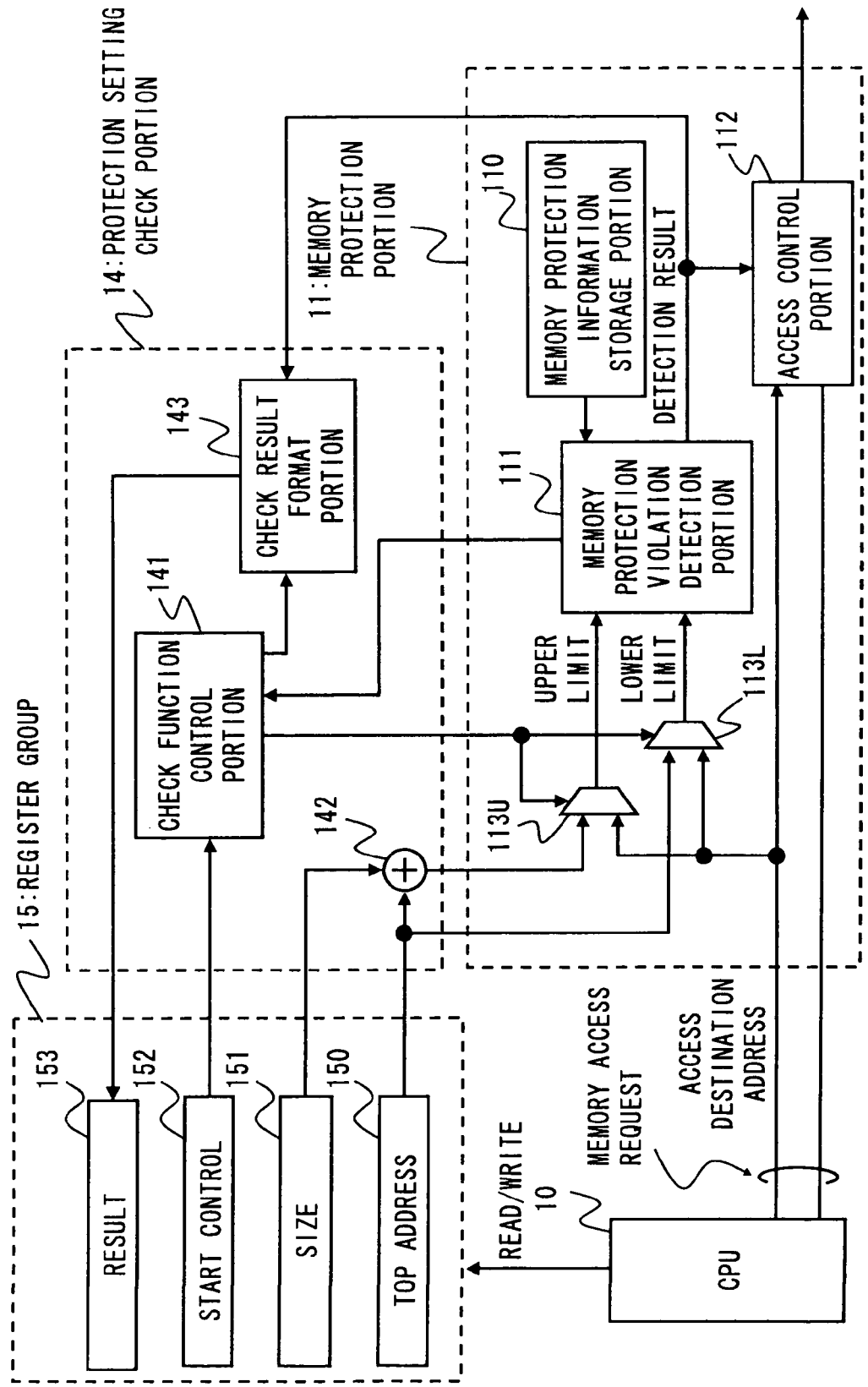
FIG. 6 shows a configuration example of a protection setting check portion included in an information processing apparatus in accordance with the first exemplary embodiment of the present invention.

FIG. 6 shows a more specific configuration example of the memory protection portion 11 and the protection setting check portion 14 as well as a group of registers 15 that are used for data exchange between the CPU 10 and the protection setting check portion 14.

With regard to the memory protection portion 11, FIG. 6 also shows selectors 113U and 113L that are contained in the selector 113. The inputs and the outputs and the operations of the selectors 113U and 113L are the same as those described above.

The protection setting check portion 14 shown in FIG. 6 has a check function control portion 141, a calculation circuit 142, and a check result format portion 143. The check function control portion 141 controls the check process for an area to be checked in response to a check request supplied from the CPU 10.

Figure 7:
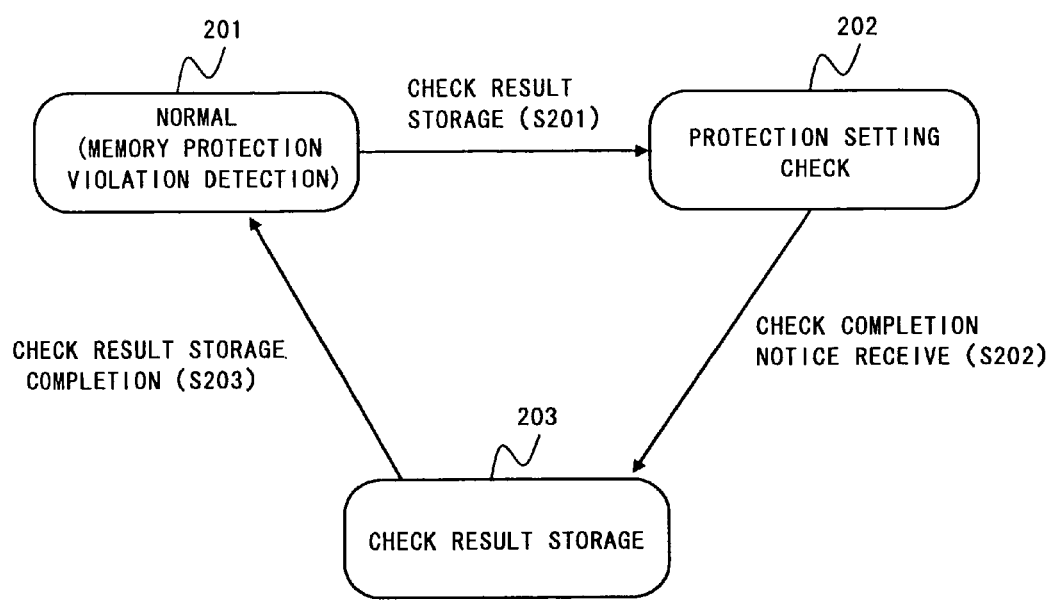
FIG. 7 is a state transition diagram of a protection setting check portion included in an information processing apparatus in accordance with the first exemplary embodiment of the present invention.

FIG. 7 is the transition diagram of the operating state of the check function control portion 141. The check function control portion 141 controls the selectors 131U and 131L such that an access destination address contained in a memory access request is supplied to the memory protection violation detection portion 111 in a normal state 201, i.e., in a state where it has not received a check request from the CPU 10.

The check function control portion 141 makes a transition to a protection setting check state 202 when it receives a check request from the CPU 10 (S201 at FIG. 7). In the protection check state 202, the selectors 131U and 131L are controlled such that the area address to be checked, which is the object of the check request, is supplied to the memory protection violation detection portion 111. In response to that, the memory protection violation detection portion 111 carries out a process similar to that carried out on the access destination address on the area address to be checked, and outputs the detection result.

Note that, in the example of FIG. 6, the top address and the size of the area to be checked are used as address information in regard to the area to be checked contained in the check request. Therefore, the upper address of the area to be checked is generated by adding the size of the area to be checked to the top address of the area to be checked at an adder circuit 142, and the generated upper address is supplied to the selector 131U in the example of FIG. 6.

The check function control portion 141 makes a transition to a check result storage state 203 after the detection by the memory protection violation detection portion 111 is finished. For example, the memory protection violation detection portion 111 may output a notice of the completion to the check function control portion 141 when the detection by the memory protection violation detection portion 111 is completed, and the check function control portion 141 may make the transition to the check result storage state upon receiving that notice of completion (S202 in FIG. 7). Furthermore, the check function control portion 141 may make the transition to the check result storage state 203 after the lapse of a predetermined time period without carrying out the explicit reception of the notice of completion. In the check result storage state 203, the check result format portion 143 receives the detection result from the memory protection violation detection portion 111, formats it into an appropriate data format by carrying out integration, selection, and a similar process on the detection result, and outputs the formatted check result to a storage area to which the CPU 10 can refer to. After the completion of the check result output, the check function control portion 141 returns to the normal state 201 (S203 in FIG. 7).

In the example of FIG. 6, four registers included in the group of registers 15 are used for the data exchange between the CPU 10 and the protection setting check portion 14 in regard to the check request and the check result. A top address register 150 is a register where the top address of the addresses to be checked is stored, which is written by the CPU 10 and read by the protection setting check portion 14. A size register 151 is a register in which the size of the area to be checked is stored, which is written by the CPU 10 and read by the protection setting check portion 14. A start control register 152 is a register to which writing is carried out by the CPU 10 in order to cause the protection setting check portion 14 to start a check. The protection setting check portion 14 in FIG. 6 makes a transition to the above-mentioned protection setting check state 202 upon writing of data indicating the start of a check to the start control register 152, and starts to a check process for the area address to be checked. Finally, a result register 153 is a register to which a check result formatted by the check result format portion 143 is written. The CPU 10 in FIG. 6 obtains the check result from the protection setting check portion 14 through the result register 153.

Note that the structure shown in FIG. 6 is merely one specific configuration example of an information processing apparatus 1 in accordance with the first exemplary embodiment of the present invention. For example, FIG. 6 shows a configuration example in which the protection setting check portion 14 starts a check process upon writing to the start control register 152 by the CPU 10. However, as an alternative structure, the protection setting check portion 14 may receive a special instruction or command from the CPU 10, and carry out a check process in accordance with that instruction or command.

Figure 8:
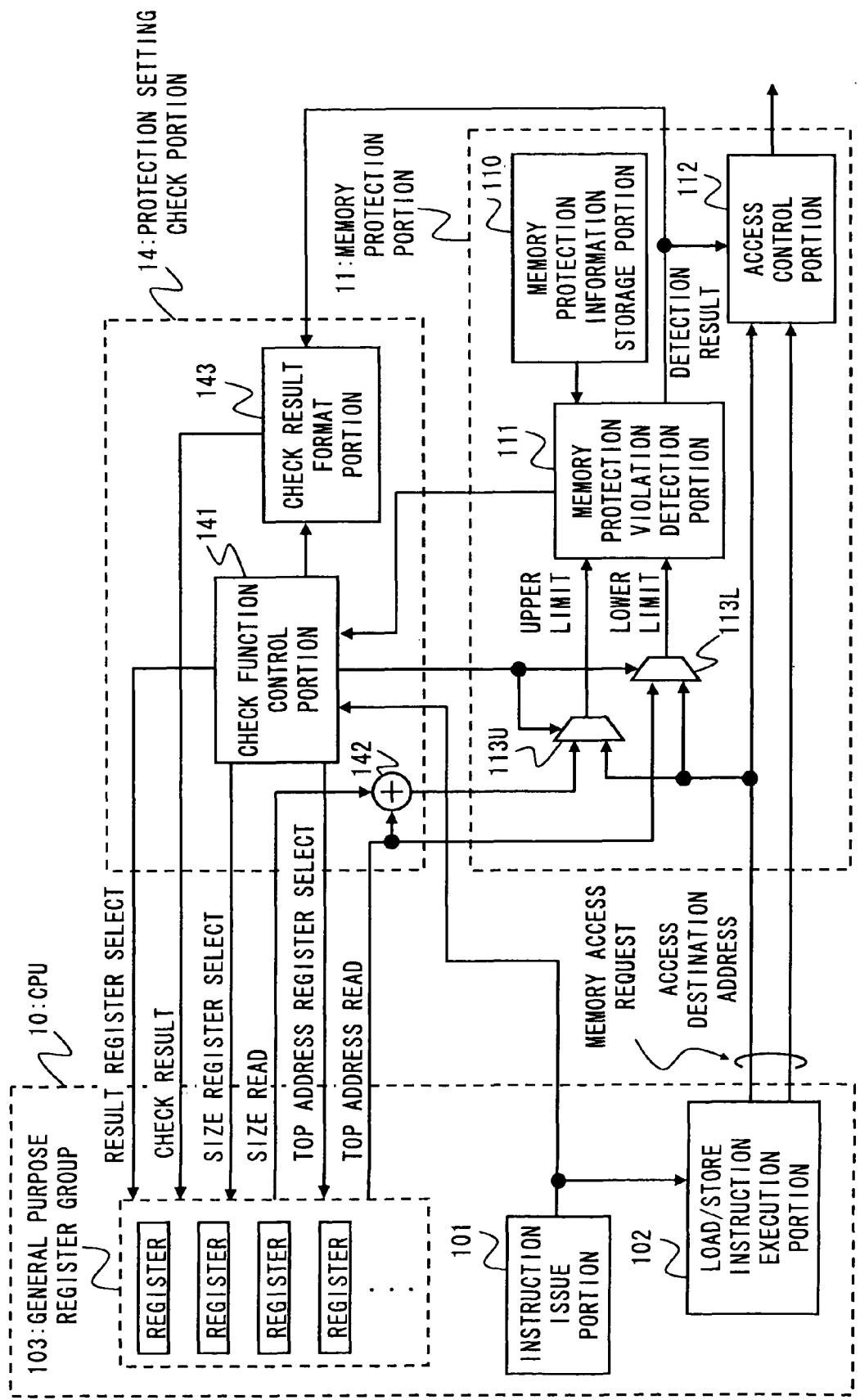
FIG. 8 shows a configuration example of a protection setting check portion included in an information processing apparatus in accordance with the first exemplary embodiment of the present invention.

FIG. 8 shows a configuration example in which the protection setting check portion 14 carries out a check process in accordance with a special instruction supplied from the CPU 10. In FIG. 8, when the decoded instruction is a special instruction indicating the execution of a check process, an instruction issue portion 101 contained in the CPU 10 supplies that special instruction to the check function control portion 141. A load/store instruction execution portion 102 carries out memory access to the memory 13 based on a load instruction and a store instruction supplied from the instruction issue portion 101.

A group of general purpose registers 103 is a group of registers that are usable for various uses such as a use as a storage place for input and output data of the load/store instruction execution portion 102 and other instruction execution portions (not shown) such as an ALU, and a use as a storage place for a base address or an index value for the use of the register indirectly addressing mode. In the example of FIG. 8, the group of general purpose registers 103 is used to store the top address and the size of an area to be checked as well as a check result output from the protection setting check portion 14.

Upon receiving a special instruction relating to a check request, the check function control portion 141 in FIG. 8 refers to a general purpose register designated in the operand of that instruction, and reads out the top address and the size of an area to be checked from the group of general purpose registers 103. Furthermore, the check function control portion 141 selects a result register designated in the operand of the special instruction, and stores the formatted check result in the designated result register.

Next, the relation between the memory protection setting stored in the memory protection information storage portion 110 for the caller program and the result of a protection setting check that is carried out by the protection setting check portion 14 before the actual execution of the called program is explained hereinafter with reference to FIGS. 9 and 10.

Figure 9:
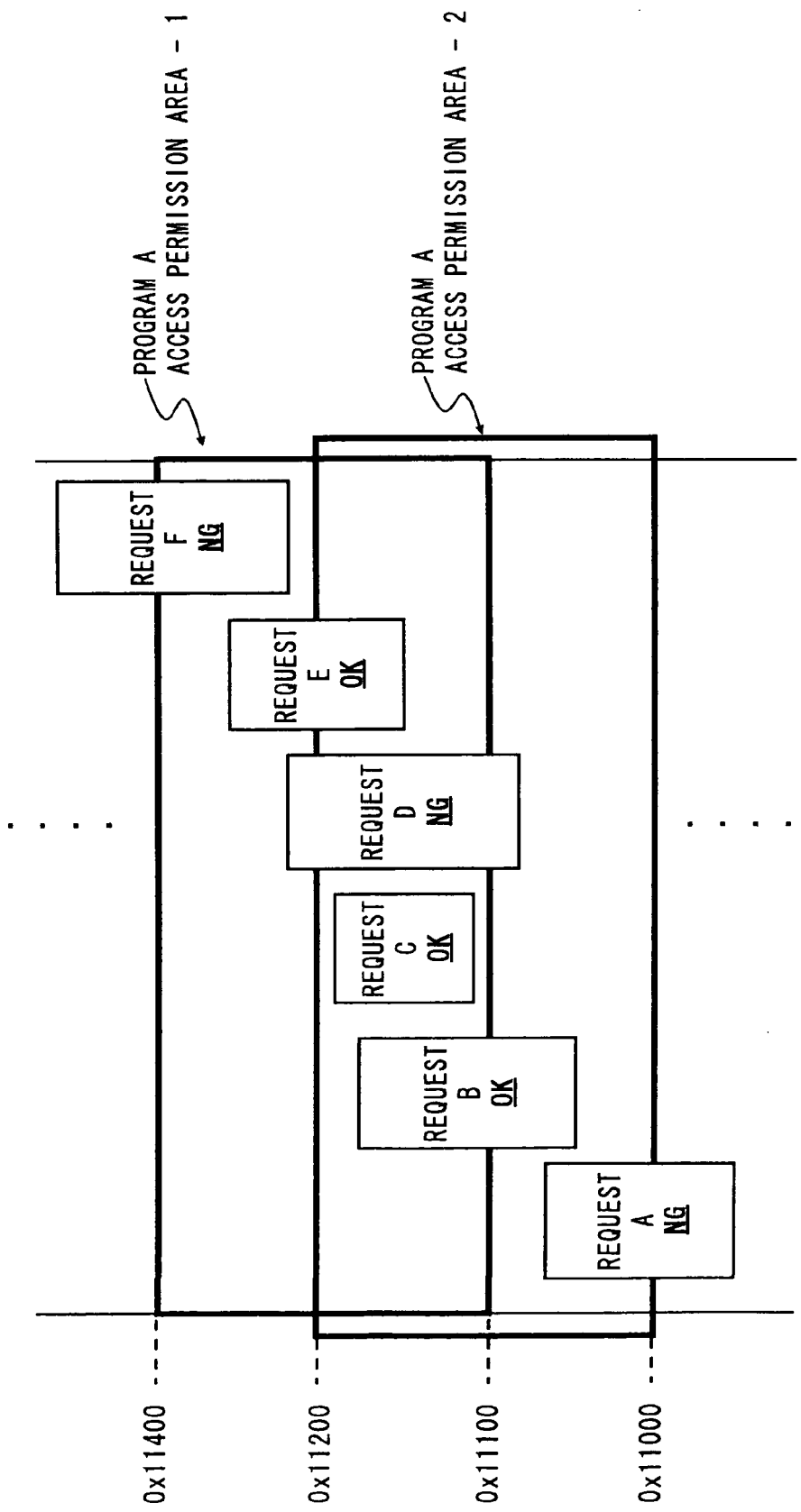
FIG. 9 is a figure for illustrating protection setting check operation by an information processing apparatus in accordance with the first exemplary embodiment of the present invention.

FIG. 9 is a conceptual diagram showing a memory map in a case where two access permission areas are established for the application program A. Note that the application program A is the caller program shown in FIG. 2. The first access permission area (access permission area 1) is addresses 11100-11400. Furthermore, the second access permission area (access permission area 2) is addresses 11000-11200. That is, the two permission areas overlap with each other in a part of them, i.e., in the addresses 11100-11200.

In the case where several access permission areas are established, the determination whether an area to be checked that spreads over several access permission areas is determined as normal or abnormal (violation) is a technical matter that is selectable as appropriate based on the design policy of the designer or the user of that particular information processing apparatus 1, and the memory protection violation detection portion 111 should be configured in accordance with that design policy. In the examples in FIG. 9 and FIG. 10 (which is explained later), such access permission areas are regarded as abnormal (violation).

Referring to the example of FIG. 9 in detail, a check result for a check request B becomes "normal" since the area to be checked for the check request B is completely contained in the permission area 2. Similarly, a check result for a check request E becomes "normal" since the area to be checked for the check request E is completely contained in the permission area 1. Furthermore, a check result for a check request C also becomes "normal" since the area to be checked for the check request C is completely contained in both the permission areas 1 and 2. Meanwhile, check results for check requests A and F become "abnormal" since the areas to be checked for these check requests spread beyond the access permission areas. Furthermore, a check result for a check request D also becomes "abnormal" since the area to be checked for the check request D spreads over both two access areas 1 and 2.

Figure 10:
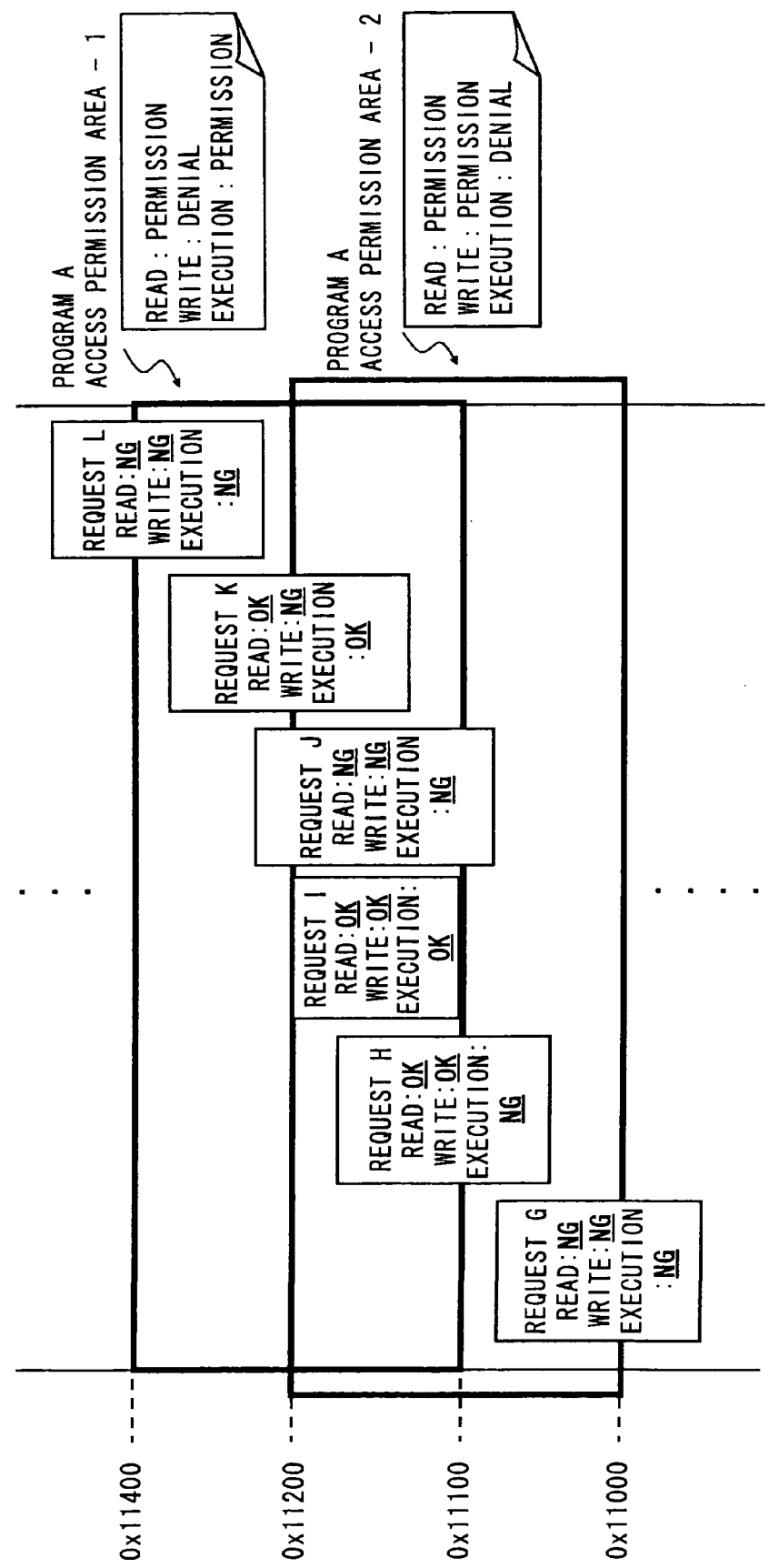
FIG. 10 is a figure for illustrating protection setting check operation by an information processing apparatus in accordance with the first exemplary embodiment of the present invention.

Next, explanation is made with reference to FIG. 10. FIG. 10 shows a case where detailed decisions are made in regard to the three types of access shown in FIG. 5, in particular write access, read access, and instruction fetch access. In the example of FIG. 10, read access and instruction fetch access are permitted, but write access is prohibited for the access permission area 1. Furthermore, read access and write access are permitted, but instruction fetch access is prohibited for the access permission area 2.

Referring to the example of FIG. 10 in detail, all types of access are prohibited for check requests G, J, and L. This is because the areas to be checked include areas outside of the access permission areas, or the areas to be checked spread over several access permission areas. Meanwhile, since the area to be checked for a check request H is completely included in the access permission area 2, the check result is output in accordance with the access permission area 2. Similarly, since the area to be checked for a check request K is completely included in the access permission area 1, the check result is output in accordance with the access permission area 1. Meanwhile, the area to be checked for a check request I is completely included in the overlap area of the access permission areas 1 and 2. In such a case, the determination on which decision method (i.e., AND decision or OR decision) is used to determine the permission in regard to two access permission areas is a design matter that is selectable as appropriate for that particular information processing apparatus 1. The example of FIG. 10 shows a case where the permission in regard to the two access permission areas 1 and 2 is determined by using OR decision. Therefore, the check result for the check request I becomes "normal" for all of write access, read access, and instruction fetch access.

As described above, when the execution program is switched from an program A to a program B as a result of a program call for the program B by the program A in an information processing apparatus 1 in accordance with the first exemplary embodiment of the present invention, the CPU 10 outputs a check request containing address information that is used to specify an area to be checked. Furthermore, it is configured such that the protection setting check portion 14 checks, in response to this check request, whether the check request conforms to memory protection setting for the program A based on memory protection information that is established in the memory protection information storage portion 110 to detect a violation by the access request by the program A.

This structure eliminates the need to read the memory protection information into the CPU 10 in order to check that memory protection information, and while the CPU 10 executes programs A and B, the validity for the readout of the program B by the program A can be verified by the protection setting check portion 14 that is provided independently from the CPU 10.

Furthermore, the protection setting check portion 14 can carry out a check for an area to be checked to detect a violation by the access request by the caller program A by using the memory protection information, which is already established in the memory protection information storage portion 110, without requiring any additional process. That is, since no read operation or write operation for additional memory protection information is required to carry out the check for the area to be checked, the efficiency of the check process can be further improved.

Furthermore, the protection setting check portion 14 in accordance with the first exemplary embodiment of the present invention requires no hardware in its own to compare an area address to be checked with memory protection information. That is, the structure of the information processing apparatus 1 is simplified by using the hardware contained in the memory protection violation detection portion 111 both as the checking circuit to compare an access destination address with memory protection information and as the hardware that should be otherwise contained in the protection setting check portion 14.

Furthermore, the memory protection violation detection portion 111 has such a structure that a plurality of checking circuits are provided in parallel as shown in FIG. 5. Therefore, even when several access permission areas are established for a program A, the comparison between each of the several access permission areas and an area address to be checked can be carried out in parallel. That is, the increase in the checking time, which would be otherwise increases in proportion to the number of access permission areas to be established, can be minimized. Therefore, by using a structure like the one shown in FIG. 5, i.e., a structure in which a plurality of hardware pieces to compare area addresses to be checked with memory protection information are arranged in parallel, the efficiency of the validity check that is carried out when a program call occurs can be further improved.

In fact, checking circuits are often arranged in parallel as shown in FIG. 5 in order to carry out memory protection for a memory access request with efficiency. Therefore, as stated above with the first exemplary embodiment of the present invention, the structure in which the checking circuit contained in the memory protection violation detection portion 111 also serves as the hardware to compare an area address to be checked with memory protection information has advantageous effects both for simplifying the structure and for improving the efficiency of the address check.

[Second Exemplary Embodiment]

Although the present invention is applied to memory protection in the above-described exemplary embodiment of the present invention, the present invention is also applicable to peripheral device protection. An information processing apparatus 2 in accordance with a second exemplary embodiment of the present invention has a peripheral device protection function, and has a function to determine, at the occurrence of a program call, the permission/prohibition of the execution of the called program in terms of peripheral device protection.

Figure 11:
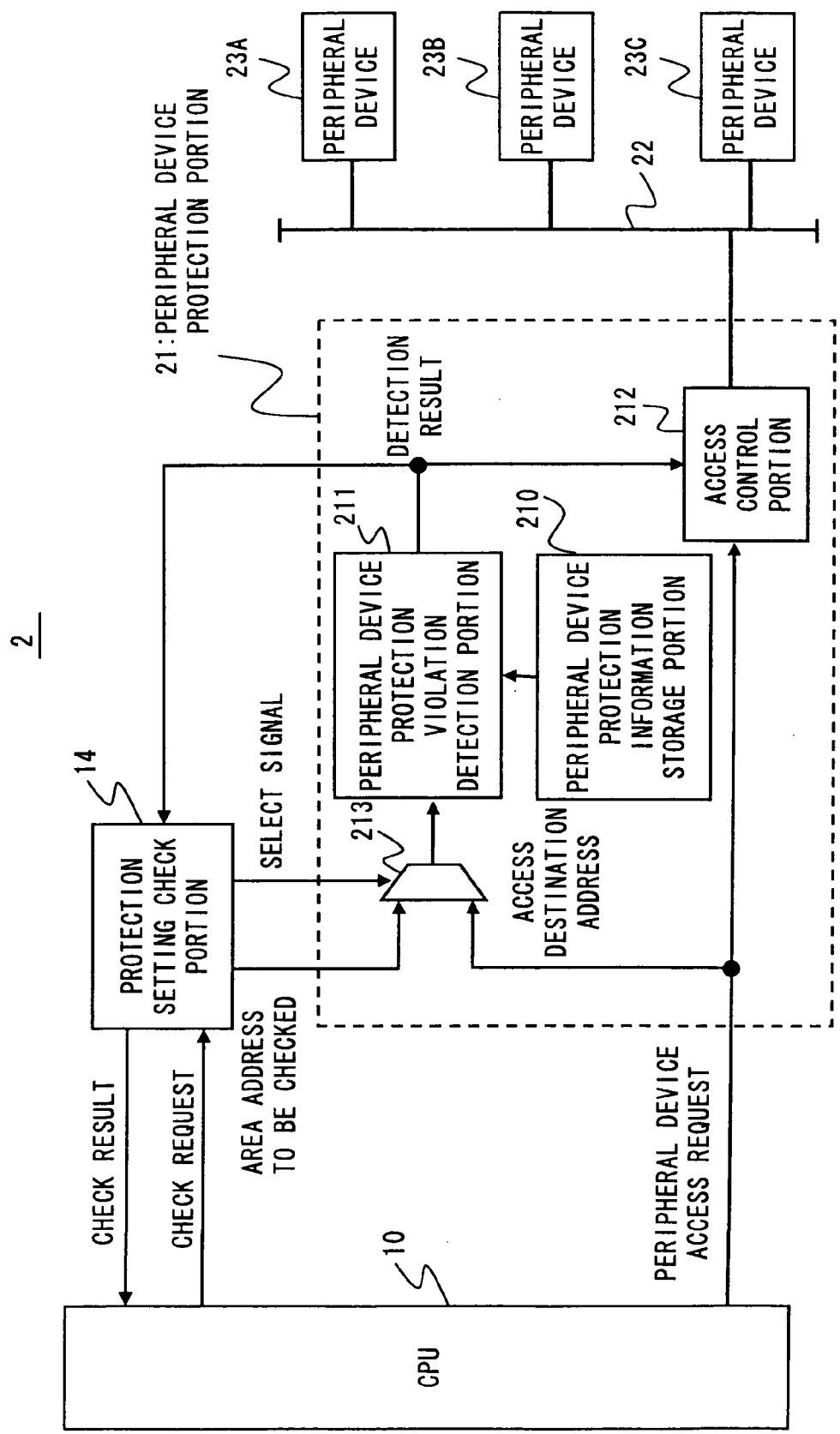
FIG. 11 is a block diagram showing the structure of an information processing apparatus in accordance with a second exemplary embodiment of the present invention.

FIG. 11 is a block diagram showing the structure of the principal parts of the information processing apparatus 2 in accordance with the second exemplary embodiment of the present invention. In FIG. 11, a peripheral device protection portion 21 is provided in place of the memory protection portion 11 shown in FIG. 1 and interposed between the CPU 10 and peripheral devices 23A-23C that are accessed by the CPU 10, and controls the access from the CPU 10 and those peripheral devices.

A peripheral device protection information storage portion 210 stores peripheral device protection information suited for a program executed by CPU 10 at that moment. The peripheral device protection information storage portion 210 is updated in response to the switching of the execution program executed in the CPU 10 such that it has setting suited for the program to be executed after the switching. The rewriting to the peripheral device protection information storage portion 210 is carried out, for example, by a system program that is invoked upon switching of the program executed in the CPU 10. The designation of access permission or prohibition in the peripheral device protection information can be also carried out in various formats, and the actual format may be determined arbitrarily. For example, the peripheral device protection information maybe a group of one-bit identification data, each indicating access permission or denial for each of the peripheral devices 23A-23C.

A peripheral device protection violation detection portion 211 determines whether an access request to a peripheral device is permitted or not by comparing an access destination address to which the CPU 10 requests access with the peripheral device protection information established in the peripheral device protection information storage portion 210.

When an access destination address contained in a peripheral device access request indicates a peripheral device to which the access is permitted, an access control portion 212 permits access to that peripheral device. On the other hand, when the access destination address indicates a peripheral device to which the access is prohibited, the access control portion 212 prohibits access to that peripheral device. Note that when the peripheral device protection violation detection portion 211 or the access control portion 212 detects access to a peripheral device to which the access is prohibited, it preferably outputs a signal indicating the detection of the unauthorized access to the CPU 10.

The structure and the operation of each of a selector 213 and a protection setting check portion 14 shown in FIG. 11 may be the same as those of the selector 113 and the protection setting check portion 14 explained in the first exemplary embodiment, except that target addresses are addresses designating peripheral devices.

Needless to say, the structure described above with reference to FIG. 11 is merely an example. For example, although the peripheral device protection portion 21 directly accesses to a peripheral bus 22 in the above explanation, the access to the peripheral bus 22 and the peripheral devices 23A-23C may be carried out through another device such as a bus controller (not shown) and a bus bridge (not shown). Furthermore, the same physical transmission paths may be shared at least partially between the check requests and the access requests.

Figure 12:
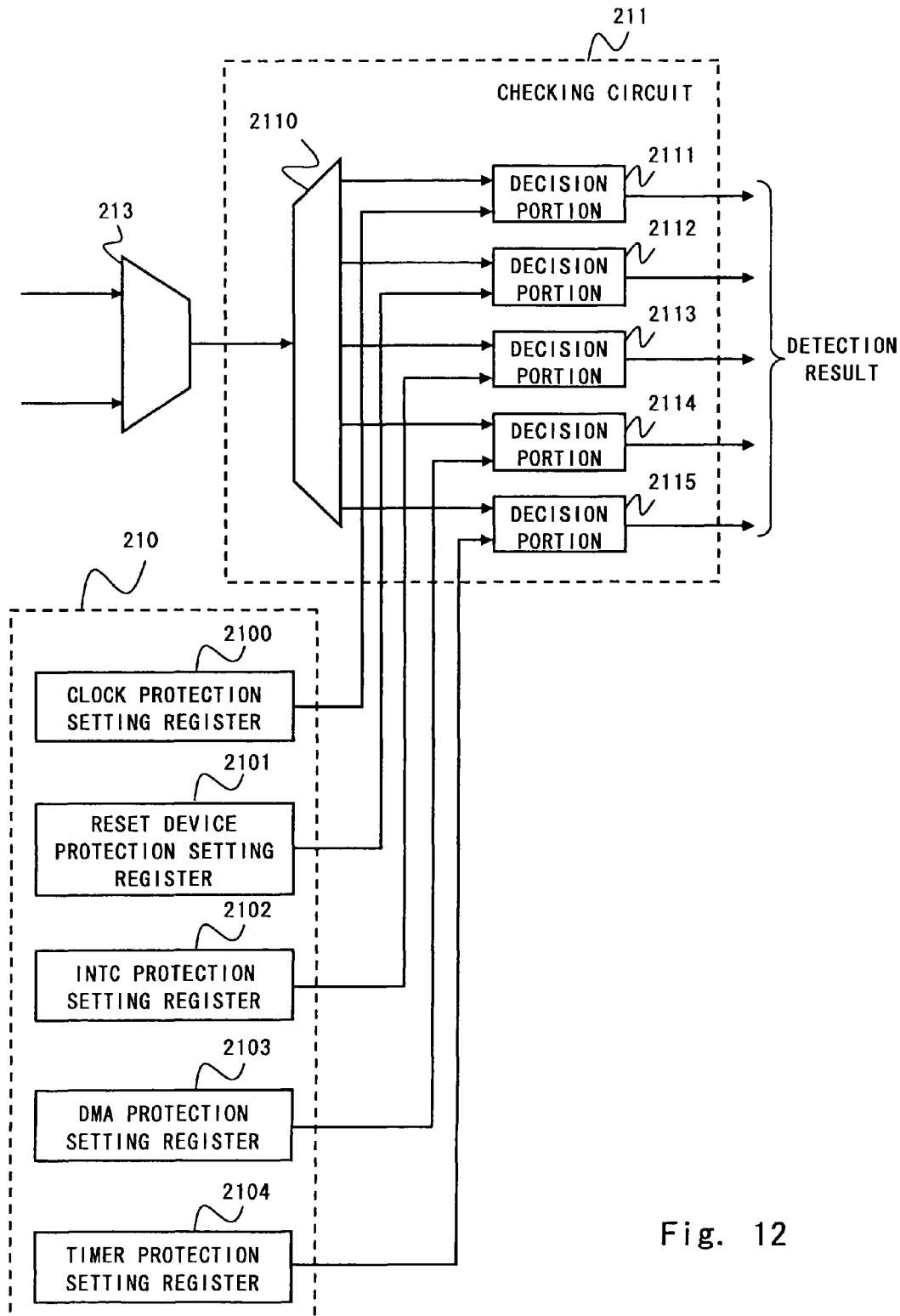
FIG. 12 shows configuration examples of a peripheral device protection information storage portion and a peripheral device protection violation detection portion included in an information processing apparatus in accordance with the second exemplary embodiment of the present invention.

FIG. 12 shows a configuration example of the peripheral device protection information storage portion 210 and the peripheral device protection violation detection portion 211. The peripheral device protection information storage portion 210 shown in FIG. 12 has a plurality of protection setting registers 2100-2104. Access permission/denial for each peripheral device is designated by each of the protection setting registers 2100-2104. In the example of FIG. 12, the protection setting registers 2100-2104 store protection information in regard to a clock device, a reset device, an interrupt controller (INTC), and a DMA (Direct Memory Access) controller, all of which are peripheral devices. Only necessary requirement for the protection setting registers 2100-2104 is that each of them should retain, for example, one-bit identification data indicating the access permission or denial of a corresponding peripheral device.

The peripheral device protection violation detection portion 211 shown in FIG. 12 has an address decoder 2110, and the same number of decision portions 2111-2115 as the number of the protection setting registers 2100-2104. The address decoder 2110 decodes an access destination address or an area address to be checked that is input through the selector 213, and selects one of the decision portions 2111-2115 that are arranged so as to correspond to their respective peripheral device types. The decision portions 2111-2115 receives peripheral device protection information stored in the protection setting registers 2100-2104 and a select signal from the address decoder 2110, and outputs a detection result indicating access permission or denial.

Note that the information processing apparatus 2 controls the operation of the selector 213 in response to a check request from the CPU 10 and carries out a check on a area to be checked by using the peripheral device protection information stored in the peripheral device protection information storage portion 210 and using the peripheral device protection violation detection portion 211 in a similar manner to the above-described exemplary embodiment of the present invention.

The information processing apparatus 2 in accordance with the second exemplary embodiment of the present invention can verify, when the execution program is switched from an program A to a program B as a result of a program call for the program B by the program A, the validity for the readout of the program B by the program A in terms of peripheral device protection with efficiency.

[Third Exemplary Embodiment]

In the structures of the previous exemplary embodiments, the hardware that is used to compare an area address to be checked with memory protection information or peripheral device protection information is not provided in the protection setting check portion 14, and the hardware contained in the memory protection violation detection portion 111 or the peripheral device protection violation detection portion 211 is used for that purpose in addition to for the original purpose. However, the hardware that is used to compare an area address to be checked with memory protection information or peripheral device protection information may be provided in the protection setting check portion 14 although the structure may become redundant.

Figure 13:
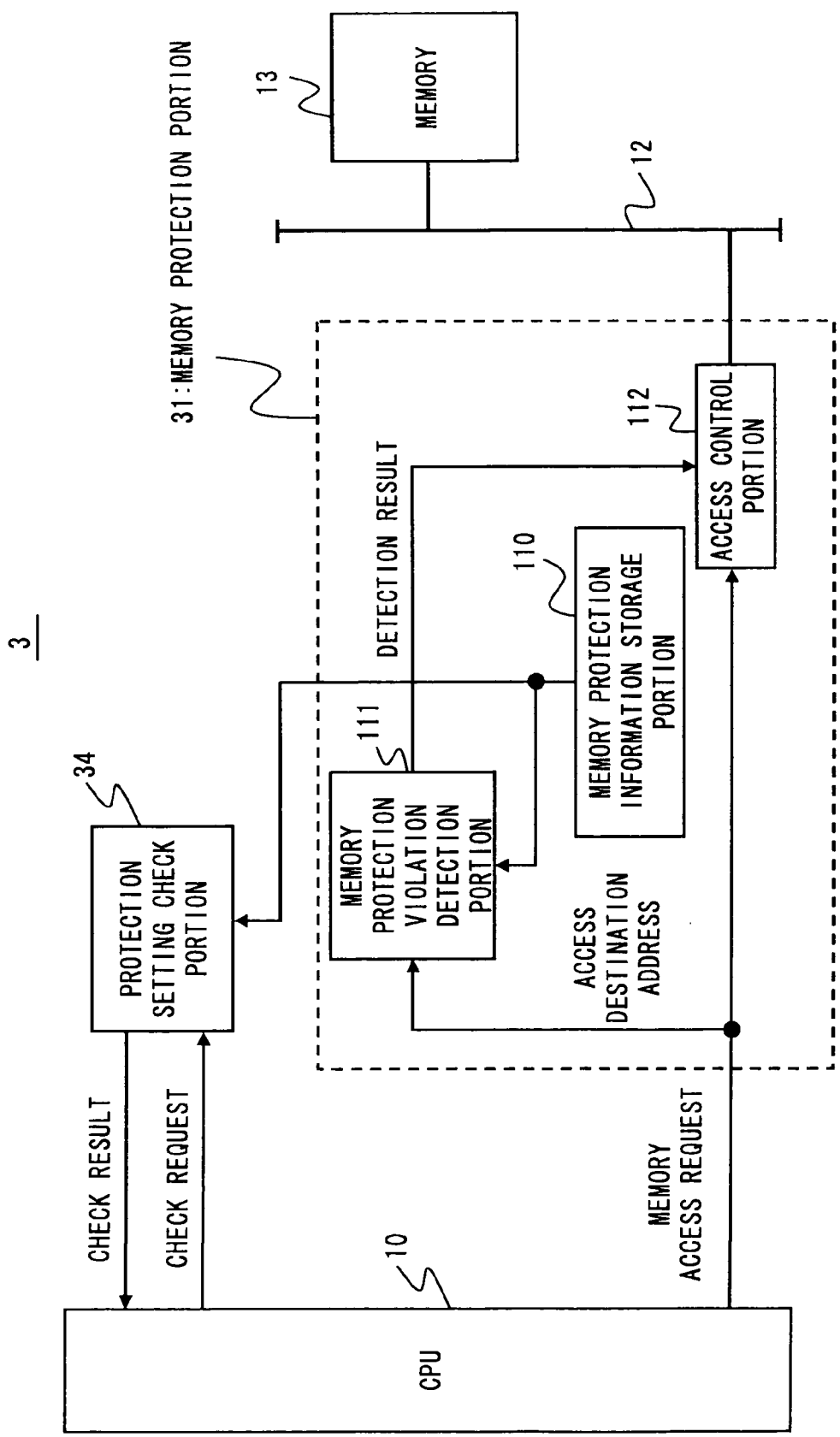
FIG. 13 is a block diagram showing the structure of an information processing apparatus in accordance with a third exemplary embodiment of the present invention.

FIG. 13 shows the structure of an information processing apparatus 3 in accordance with a third exemplary embodiment of the present invention. In FIG. 13, a protection setting portion 34 is constructed by adding hardware to compare an area address to be checked with memory protection information or peripheral device protection information in the protection setting check portion 14 contained in the information processing apparatus 1 in accordance with the first exemplary embodiment of the present invention. Note that the hardware for comparison added in the protection setting portion 34 may be the same circuit as the checking circuit contained in the memory protection violation detection portion 111 shown in FIG. 5.

Also note that the information processing apparatus 1-3 in accordance with above-described exemplary embodiments of the present invention may be constructed, for example, as a microcomputer integrated into a single chip, or may be constructed as a computer system composed of plural chips.

Furthermore, needless to say, the present invention is not limited to the above-described exemplary embodiments, and various modifications are possible to them without departing from the gist of the above-described present invention.

The first, second and third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An information processing apparatus, comprising:
   an instruction execution portion capable of switching between and executing a first program and a second program, the instruction execution portion being configured to output an access request including first access destination address information by the first program and to output a check request including second access destination address information when the execution program is switched from the first program to the second program as a result of a program call from the first program to the second program;
   a protection information storage portion to store protection information, the protection information designating a permission/denial for access from a program to be executed in the instruction execution portion;
   a protection violation detection portion to detect whether the access request including the first access destination address information is in violation or not, based on the protection information, the protection information being established in the protection information storage portion so as to correspond to the first program; and
   a protection setting check portion to check whether or not the check request including the second access destination address information conforms to a protection setting for the first program, based on the protection information, the protection information being established in the protection information storage portion to detect a violation by the access request by the first program; and
   a selector circuit to selectively supply one of the first access destination address information contained in the access request and the second access destination address information contained in the check request to the protection violation detection portion,
   wherein the protection setting check portion includes a check function control portion configured to receive a result of the detection from the protection violation detection portion and to output a result of the check request to the instruction execution portion.

2. The information processing apparatus according to claim 1, further comprising:
   a first checking circuit to compare the protection information contained in the protection violation detection portion with the first access destination address information; and
   a second checking circuit to compare the protection information contained in the protection check portion with the second access destination address information,
   wherein the first checking circuit and the second checking circuit are constructed as hardware independent of the instruction execution portion.

3. The information processing apparatus according to claim 2, wherein the first checking circuit comprises the second checking circuit.

4. The information processing apparatus according to claim 3, wherein the second access destination address information includes a designation of an address to which the first program indirectly requests access through the second program being called.

5. The information processing apparatus according to claim 4, wherein the second access destination address information is designated in an argument at a call of the second program.

6. The information processing apparatus according to claim 2, wherein the second access destination address information includes a designation of an address to which the first program indirectly requests access through the second program being called.

7. The information processing apparatus according to claim 6, wherein the second access destination address information is designated in an argument at a call of the second program.

8. The information processing apparatus according to claim 1, wherein the second access destination address information includes a designation of an address to which the first program indirectly requests access through the second program being called.

9. The information processing apparatus according to claim 8, wherein the second access destination address information is designated in an argument at a call of the second program.

10. The information processing apparatus according to claim 1, wherein, when the check request conforms to the protection setting for the first program, the instruction execution portion executes the second program.

11. The information processing apparatus according to claim 10, wherein, when the check request does not conform to the protection setting for the first program, the instruction execution portion does not execute the second program.

12. The information processing apparatus according to claim 1, further comprising an access control portion that permits an access to a memory when the second access destination address information contained in a memory access request indicates a memory area to which the access to the memory is permitted.

13. The information processing apparatus according to claim 12, wherein the access control portion prohibits the access to the memory when the second access destination address information contained in the memory indicates a memory area to which the access to the memory is prohibited.

14. The information processing apparatus according to claim 1, further comprising a memory with plurality of areas including:
   a first area;
   a second area; and
   a third area,
   wherein the first access destination address information includes:
      a first access permission area including the first area and the second area; and
      a second access permission area including the second area and the third area.

15. The information processing apparatus according to claim 14, wherein, when the check request including the second access destination address information is completely within the second area, the check request conforms to the protection setting for the first program.

16. The information processing apparatus according to claim 14, wherein the memory includes access permission areas that are regarded as normal, the access permission areas that are regarded as normal include:
   the first and second areas in combination;
   the second and third areas in combination; and
   the first, second and third areas, and
   wherein, when the second access destination address information is completely within an access permission area that is regarded as normal, the protecting setting portion detects the violation of the access request of the first program.

17. The information processing apparatus according to claim 16, wherein the memory further includes access permission areas that are regarded as abnormal, the access permission areas that are regarded as abnormal include:
   a combination of the first, second and third areas;
   a combination of the first area and an area other than the second area beyond the first area; and
   a combination of the third area and an area other than the second area beyond the third area, and
   wherein, when the second access destination address information is completely within an access permission area that is regard as abnormal, the protection setting portion detects the violation of the access request of the first program.

18. A program execution control method in an information processing apparatus, the information processing apparatus comprising an instruction execution portion, a protection violation detection portion, a protection setting check portion, and a selector circuit, and a protection information storage portion to store protection information to designate a permission/denial for access from a program to be executed in the instruction execution portion, the program execution control method comprising:
   detecting, while the instruction execution portion is executing a first program, whether an access request including first access destination address information output from the instruction execution portion is in violation or not, based on the protection information, the protection information being established in the protection information storage portion so as to correspond to the first program, the protection violation detection portion performing the detecting;
   checking whether a check request including second access destination address information output from the instruction executing portion conforms to a protection setting for the first program based on the protection information when the execution program is switched from the first program to a second program as a result of a program call from the first program to the second program, the protection information being established in the protection information storage portion to detect a violation by the access request by the first program, the protection setting check portion performing the checking;
   selectively supplying one of the first access destination address information contained in the access request and the second access destination address information contained in the check request to a protection violation detection portion that is used for the detecting, the selector circuit performing the supplying;
   executing the second program in response to the program call from the first program when the check request is determined to conform to the protection setting for the first program,
   wherein the protection setting check portion includes a check function control portion configured to receive a result of the detection from the protection violation detection portion and to output a result of the check request to the instruction execution portion.

19. The program execution control method according to claim 18, further comprising changing the protection information stored in the protection information storage portion to a setting suited for the second program after the checking for the check request is completed.

* * * * *